(12) United States Patent
Chakareski et al.

(10) Patent No.: US 8,699,522 B2
(45) Date of Patent: *Apr. 15, 2014

(54) SYSTEM AND METHOD FOR LOW DELAY, INTERACTIVE COMMUNICATION USING MULTIPLE TCP CONNECTIONS AND SCALABLE CODING

(75) Inventors: Jacob Chakareski, Hackensack, NJ (US); Roi Sasson, New York, NY (US); Alexandros Eleftheriadis, Tenafly, NY (US); Ofer Shapiro, Fair Lawn, NJ (US)

(73) Assignee: Vidyo, Inc., Hackensack, NJ (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/052,741

(22) Filed: Mar. 21, 2011

(65) Prior Publication Data

US 2011/0280257 A1 Nov. 17, 2011

Related U.S. Application Data

(63) Continuation of application No. 11/953,398, filed on Dec. 10, 2007, now Pat. No. 7,933,294, which is a continuation-in-part of application No. PCT/US2007/083351, filed on Nov. 1, 2007, which is a continuation-in-part of application No. PCT/US2007/063335, filed on Mar. 5, 2007, which is a continuation-in-part of application No. PCT/US2006/062569, filed on Dec. 22, 2006, which is a continuation-in-part of application No. PCT/US2006/061815, filed on Dec. 8, 2006, which is a continuation-in-part of application No. PCT/US2006/028366, filed on Jul. 21, 2006, which is a continuation-in-part of application No. PCT/US2006/028365, filed on Jul. 21, 2006.

(60) Provisional application No. 60/701,108, filed on Jul. 20, 2005, provisional application No. 60/701,109, filed on Jul. 20, 2005, provisional application No. 60/748,437, filed on Dec. 8, 2005, provisional application No. 60/753,343, filed on Dec. 22, 2005, provisional application No. 60/778,760, filed on Mar. 3, 2006.

(51) Int. Cl.
*H04J 3/24* (2006.01)

(52) U.S. Cl.
USPC ........ 370/474; 370/536; 375/240.05; 709/231

(58) Field of Classification Search
None
See application file for complete search history.

(56) References Cited

U.S. PATENT DOCUMENTS 4,958,226 A 9/1990 Haskell et al.
5,136,377 A 8/1992 Johnston et al.
(Continued)

FOREIGN PATENT DOCUMENTS

EP 1445958 8/2004
JP H09-116903 5/1997
(Continued)

OTHER PUBLICATIONS

U.S. Appl. No. 11/491,057, filed Jul. 20, 2006, Abandoned.
(Continued)

*Primary Examiner* — Khoa Huynh
(74) *Attorney, Agent, or Firm* — Baker Botts L.L.P.

(57) ABSTRACT

Systems and methods for communication of scaleable-coded audiovisual signals over multiple TCP/IP connections are provided. The sender schedules and prioritizes transmission of individual scalable-coded data packets over the plurality of TCP connections according to their relative importance in the scalable coding structure for signal reconstruction quality and according to receiver feedback. Low-latency packet delivery over the multiple TCP/IP connections is maintained by avoiding transmission or retransmission of packets that are less important for reconstructed media quality.

3 Claims, 5 Drawing Sheets

(56) References Cited

U.S. PATENT DOCUMENTS

| | | | |
|---|---|---|---|
| 5,227,878 | A | 7/1993 | Puri et al. |
| 5,500,678 | A | 3/1996 | Puri |
| 5,563,593 | A | 10/1996 | Puri |
| 6,014,694 | A * | 1/2000 | Aharoni et al. ............... 709/219 |
| 6,085,252 | A | 7/2000 | Zhu et al. |
| 6,097,697 | A | 8/2000 | Yao et al. |
| 6,496,217 | B1 | 12/2002 | Piotrowski |
| 6,643,496 | B1 | 11/2003 | Shimoyama et al. |
| 7,012,893 | B2 | 3/2006 | Bahadiroglu |
| 7,295,520 | B2 | 11/2007 | Lee et al. |
| 7,342,880 | B2 | 3/2008 | Yanagihara et al. |
| 7,542,435 | B2 | 6/2009 | Leon et al. |
| 7,593,339 | B2 | 9/2009 | Shoemake et al. |
| 7,701,851 | B2 | 4/2010 | Chakareski et al. |
| 7,817,625 | B2 | 10/2010 | Jefremov |
| 2002/0136162 | A1 | 9/2002 | Yoshimura et al. |
| 2004/0114817 | A1 | 6/2004 | Jayant et al. |
| 2004/0170395 | A1 | 9/2004 | Filippini et al. |
| 2004/0252758 | A1 | 12/2004 | Katsavounidis et al. |
| 2005/0058065 | A1 | 3/2005 | Tiller et al. |
| 2006/0023748 | A1* | 2/2006 | Chandhok et al. ............ 370/469 |
| 2006/0224763 | A1* | 10/2006 | Altunbasak et al. .......... 709/231 |
| 2007/0133405 | A1 | 6/2007 | Bowra et al. |
| 2013/0201279 | A1 | 8/2013 | Civanlar et al. |

FOREIGN PATENT DOCUMENTS

| | | |
|---|---|---|
| JP | 2005-167962 | 6/2005 |
| WO | WO 03/063505 | 7/2003 |
| WO | WO2004/036916 | 4/2004 |
| WO | WO 2004/040917 | 5/2004 |
| WO | WO 2004/043071 | 5/2004 |
| WO | WO 2004/098196 | 11/2004 |

OTHER PUBLICATIONS

U.S. Appl. No. 11/953,398, filed Dec. 10, 2007.
U.S. Appl. No. 12/015,956, filed Jan. 17, 2008.
U.S. Appl. No. 12/715,845, filed Mar. 2, 2010.
U.S. Appl. No. 11/933,865, filed May 11, 2009, Non-Final Office Action.
U.S. Appl. No. 11/933,865, filed Nov. 11, 2009, Response to Non-Final Office Action.
U.S. Appl. No. 11/933,865, filed Dec. 2, 2009, Notice of Allowance and Examiner's Interview Summary.
U.S. Appl. No. 11/953,398, filed Oct. 20, 2009, Non-Final Office Action.
U.S. Appl. No. 11/953,398, filed Apr. 20, 2010, Response to Non-Final Office Action.
U.S. Appl. No. 11/953,398, filed Jul. 23, 2010, Final Office Action.
U.S. Appl. No. 11/953,398, filed Oct. 22, 2010, Response to Final Office Action.
U.S. Appl. No. 11/953,398, filed Nov. 23, 2010, Advisory Action.
U.S. Appl. No. 11/953,398, filed Nov. 23, 2010, Amendment and response to Advisory Action.
U.S. Appl. No. 11/953,398, filed Dec. 21, 2010, Notice of Allowance.
U.S. Appl. No. 12/715,845, filed Mar. 12, 2010, Notice to Correct Application Papers.
U.S. Appl. No. 12/715,845, filed May 6, 2010, Response to Correct Application Papers.
U.S. Appl. No. 12/715,845, filed Jan. 18, 2011, Notice of Allowance.
S. Wenger, "Video Redundancy Coding in H.263+", Workshop on Audio-Visual Services for Packet Networks (aka Packet Video Workshop), 1997, 6 pages.
International Search Report and Written Opinion—PCT/US06/028365 (International Filing Date: Jul. 21, 2006).
Jinzenji, et al., "Scalable Video Conference System Using MPEG-4 ASP/FGS Software CODECs", *Japan, The Institute of Electronics, Information and Communication Engineers,* 104(752):55-60 (2005) (English Abstract only).
European Extended Search Report for EP 06788106, dated Oct. 18, 2012 (Corresponds to U.S. Appl. No. 13/621,714).
"H.263+(or H.263 version 2), Video Coding for Low Bitrate Communication", Sep. 2, 1998, No. H.263, Version 2, Feb. 9, 1998, XP030001506.
Reichel, et al., "Joint Scalable Video Model (JSVM) 3.0 Reference Encoding Algorith Description", 73. MPEG Meeting; Jul. 25-Jul. 29, 2005; Poznan, Poland; (Motion Picture Expert Group or ISO/IEC JTC1/SC29/WG11), No. N7311, Sep. 6, 2005, XP030013911.
Kirenko, et al., "Flexible Scalable Video Compression", 69. MPEG Meeting; Jul. 19-Jul. 23, 2004; Redmond; (Motion Picture Expert Group of ISO/IEC JTC1/SC29/WG11), No. M10997, Jul. 14, 2004, XP030039776.
Blake, et al., "RFC 2475: An Architecture for Differentiated Services", Internet Citation, Dec. 1998, XP002220520; Retrieved from the Internet: URL:ftp.//ftp.isi.edu/in-notes/rfc2475.txt [retrieved on Nov. 11, 2002].
Eleftheriadis, et al., "Multipoint videoconferencing with scalable video coding", Journal of Zhejiang University Science A; An International Applied Physics & Engineering Journal, Springer, Berlin, DE, 7(5):696-705 (May 1, 2006), XP019385029.

* cited by examiner

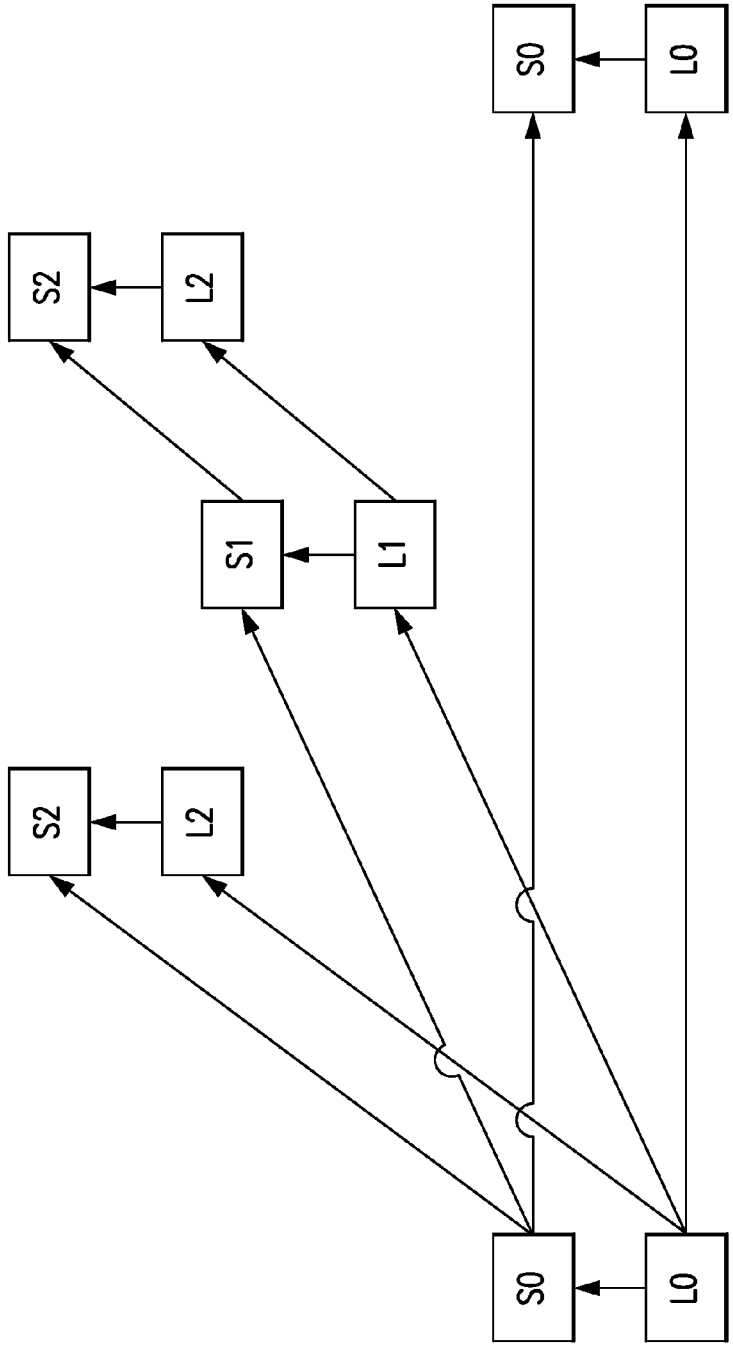

SYSTEM AND METHOD FOR LOW DELAY, INTERACTIVE COMMUNICATION USING MULTIPLE TCP CONNECTIONS AND SCALABLE CODING

CROSS-REFERENCE TO RELATED APPLICATIONS

This application is a continuation of U.S. patent application Ser. No. 11/953,398, filed Dec. 10, 2007, which is a continuation in part of International Application Serial No. PCT/US06/028365, filed Jul. 20, 2006, which claims priority from U.S. Provisional Patent Application No. 60/701,108 filed Jul. 20, 2005; a continuation in part of International patent application No. PCT/US06/028366 filed Jul. 20, 2006 which claims priority from U.S. Provisional Patent Application No. 60/701,109 filed Jul. 20, 2005; a continuation in part of International patent application No. PCT/US06/061815 filed Dec. 8, 2006, which claims priority from U.S. Provisional Patent Application No. 60/748,437 filed Dec. 8, 2005; a continuation in part of International patent application No. PCT/US06/062569 filed Dec. 22, 2006, which claims priority from U.S. Provisional Patent Application No. 60/753,343 filed Dec. 22, 2005; and a continuation in part of International patent application No. PCT/US07/63335 filed Mar. 5, 2007 which claims priority from U.S. Provisional Patent Application No. 60/778, 760 filed Mar. 3, 2006; and a continuation in part of International patent application No. PCT/US07/083, 351 filed Nov. 1, 2007. All of the aforementioned applications, which are commonly assigned, are hereby incorporated by reference herein in their entireties.

FIELD OF THE INVENTION

The present invention relates to low-delay, interactive communication systems. In particular, the invention relates to achieving low latency in packet-based communication systems in which multiple Transmission Control Protocol (TCP) connections are used for transmitting scalable coded data.

BACKGROUND OF THE INVENTION

The Transmission Control Protocol (TCP) is a transport layer protocol for reliable delivery of Internet (IP) packets (datagrams). TCP uses an Additive Increase Multiplicative Decrease (AIMD) rate control mechanism to ensure fair use of shared network resources (e.g., the available bit rate). With TCP/AIMD operation, whenever all outstanding packets sent within the last round-trip time (RTT) cycle are acknowledged by the receiver, TCP increases the transmission rate of the sender by a constant amount additively. On the other hand, when TCP detects congestion (or packet loss) by not having all outstanding packets acknowledged by the onset of the next RTT period, it halves the transmission rate of the sender, i.e., it multiplicatively reduces the rate by a factor of ½. Such TCP/AIMD rate control operation can create significant variations in the transmission bit rates, leading to exceedingly high latencies in packet delivery. This drawback makes TCP unsuitable for transport of interactive media packets, which are typically characterized by stringent delivery deadlines.

In some situations involving interactive multimedia communications, however, it is necessary to employ TCP transport in spite of its drawbacks. For example, corporate firewalls are sometimes set to block all traffic to, and from, the corporate Local Area Network (LAN) except over TCP connections. Therefore, media packets from the outside world destined for a receiver on the corporate LAN must be delivered via TCP, or otherwise face the prospect of being blocked by the firewall prior to entering the LAN.

Several studies or investigations on the use of TCP for interactive media transmission have been reported. See, e.g., Sally Floyd, Mark Handley, Jitendra Padhye, and Joerg Widmer, "Equation-Based Congestion Control for Unicast Applications," August 2000, SIGCOMM 2000; Bing Wang, Wei Wei, Zheng Guo, and Don Towsley, "Multipath Live Streaming via TCP: Performance and Benefits," UConn CSE Technical Report: BECAT/CSE-TR-06-7; S. Sakazawa, Y. Takishima, Y. Nakajima, M. Wada, and K. Hashimoto, "Multimedia contents management and transmission system 'VAST-web' and its effective transport protocol 'SVFTP'", ICME 2004; and T. Nguyen and S.-C. Cheung, "Multimedia Streaming Using Multiple TCP Connections," IPCCC 2005.

The first of these studies (i.e., Equation-Based Congestion Control for Unicast Applications) describes a TCP-friendly scheme, which provides an equation-based rate control technique as an alternative to the TCP/AIMD rate control mechanism while preserving the feature of sharing in a fair manner the available network bit rate with existing TCP flows. The equation-based rate control technique yields smoother send rate fluctuations (than TCP/AIMD) in response to network congestion, and therefore makes it more suitable for streaming applications. The second of the cited studies (i.e., Multipath Live Streaming via TCP: Performance and Benefits) considers employing TCP transport over multiple network paths in order to improve TCP performance for streaming applications. Similarly, the third and fourth of the cited studies (i.e., Multimedia contents management and transmission system 'VAST-web' and its effective transport protocol 'SVFTP', and Multimedia Streaming Using Multiple TCP Connections, respectively) explore transmission over multiple TCP connections on the same network path as a way to increase TCP throughput in media streaming. These two studies, however, deal only with stored (pre-encoded) media content in the context of multimedia content management systems and streaming applications, respectively; furthermore, they treat the individual media packets uniformly, and do not take advantage of a possible scalable structure in the transmitted media. When scalable coding is used in the transmitted media, different packets have different importance in terms of how they affect the reconstruction quality of the media in the receiver.

Scalable coding is a well-known technique in multimedia data encoding, in which the encoder generates two or more "scaled" bitstreams that collectively represent a given medium in a bandwidth-efficient manner. Scalability can be provided in a number of different dimensions, namely temporal, spatial, and quality (also referred to as SNR (Signal-to-Noise Ratio) scalability) dimensions. For example, a video signal may be scalable-coded in different layers at CIF and QCIF resolutions, and at frame rates of 7.5, 15, and 30 frames per second (fps). Depending on the codec's structure, any combination of spatial resolutions and frame rates may be obtainable from the codec bitstream. The bits corresponding to the different layers can be transmitted as separate bitstreams (i.e., one stream per layer), or they can be multiplexed together in one or more bitstreams. For convenience in description herein, the coded bits corresponding to a given layer may be referred to as that layer's bitstream, even if the various layers are multiplexed and transmitted in a single bitstream. Codecs specifically designed to offer scalability features include, for example, MPEG-2 (ISO/IEC 13818-2, also known as ITU-T H.262) and the currently developed SVC (known as ITU-T H.264 Annex G or MPEG-4 Part 10 SVC). Scalable coding techniques specifically designed for video communication are described, for example, in commonly assigned International Patent Application No. PCT/US06/028365 "SYSTEM AND METHOD FOR SCALABLE AND LOW-DELAY VIDEOCONFERENCING USING SCALABLE VIDEO CODING."

It is noted that even codecs that are not specifically designed to offer scalability features can exhibit scalability characteristics in the temporal dimension. For example, consider an MPEG-2 Main Profile codec, a non-scalable codec, which is used in DVDs and digital TV environments. Further, assume that the codec is operated at 30 fps and that a group of pictures (GOP) structure of IBBPBBPBBPBBPBB (period N=15 frames) is used. By sequential elimination of the B pictures, followed by elimination of the P pictures, it is possible to derive a total of three temporal resolutions: 30 fps (all picture types included), 10 fps (I and P only), and 2 fps (I only). The sequential elimination process results in a decodable bitstream because the MPEG-2 Main Profile codec is so designed that coding of the P pictures does not rely on the B pictures, and, similarly, coding of the I pictures does not rely on other P or B pictures. For convenience, in the following description, single-layer codecs with temporal scalability features are considered to be a special case of scalable video codecs, and understood to be included in the term "scalable video coding" unless explicitly indicated otherwise.

Scalable codecs typically have a pyramidal bitstream structure in which one of the constituent bitstreams (called the "base layer") is essential in recovering the original medium at some basic quality. Use of one or more of the remaining bitstream(s) (called the "enhancement layer(s)") together with the base layer increases the quality of the recovered medium. Data losses in the enhancement layers may be tolerable, but data losses in the base layer can cause significant distortions or complete loss of the recovered medium.

Simulcasting is a coding solution that is less complex than scalable coding but has some of the advantages of the latter. In simulcasting, two different versions of the source are encoded (e.g., at two different spatial resolutions) and transmitted. Each version is independent, in that its decoding does not depend on reception of the other version. In the following description, simulcasting is considered to be a special case of scalable coding (where no inter layer prediction is performed), and referred to simply as scalable coding unless explicitly indicated otherwise.

Consideration is now being given to improving packet-based communication systems in which multiple TCP connections are used for transmitting scalable coded data. In particular, attention is being directed to live audio and video communication scenarios where providing low latency packet delivery is essential.

SUMMARY OF THE INVENTION

Systems and methods for packet-based communication of scalable coded media are provided. The systems and methods include mechanisms for TCP-based transport of media packets for low-delay, interactive communication applications such as videoconferencing. Multiple TCP connections are established between sender and receiver for communication of the media packets. The sender makes scheduling decisions based on the media packets' importance in the scalable coding structure and on feedback from the receiver (e.g., on the status of individual TCP connections).

The systems and methods take into account the varying importance of the scalable coded packets to the quality of the reconstructed media when making scheduling decisions. Such decisions are made to maintain low latency packet delivery and to provide an acceptable audio-visual presentation experience of the received media despite the TCP rate control mechanism. The systems and methods overcome the limitations TCP and its AIMD rate control mechanism that cause detrimental delay in interactive media applications.

BRIEF DESCRIPTION OF THE DRAWINGS

FIG. 5 is a schematic diagram illustrating an exemplary scalable video picture coding structure (prior art).

Figure 1:
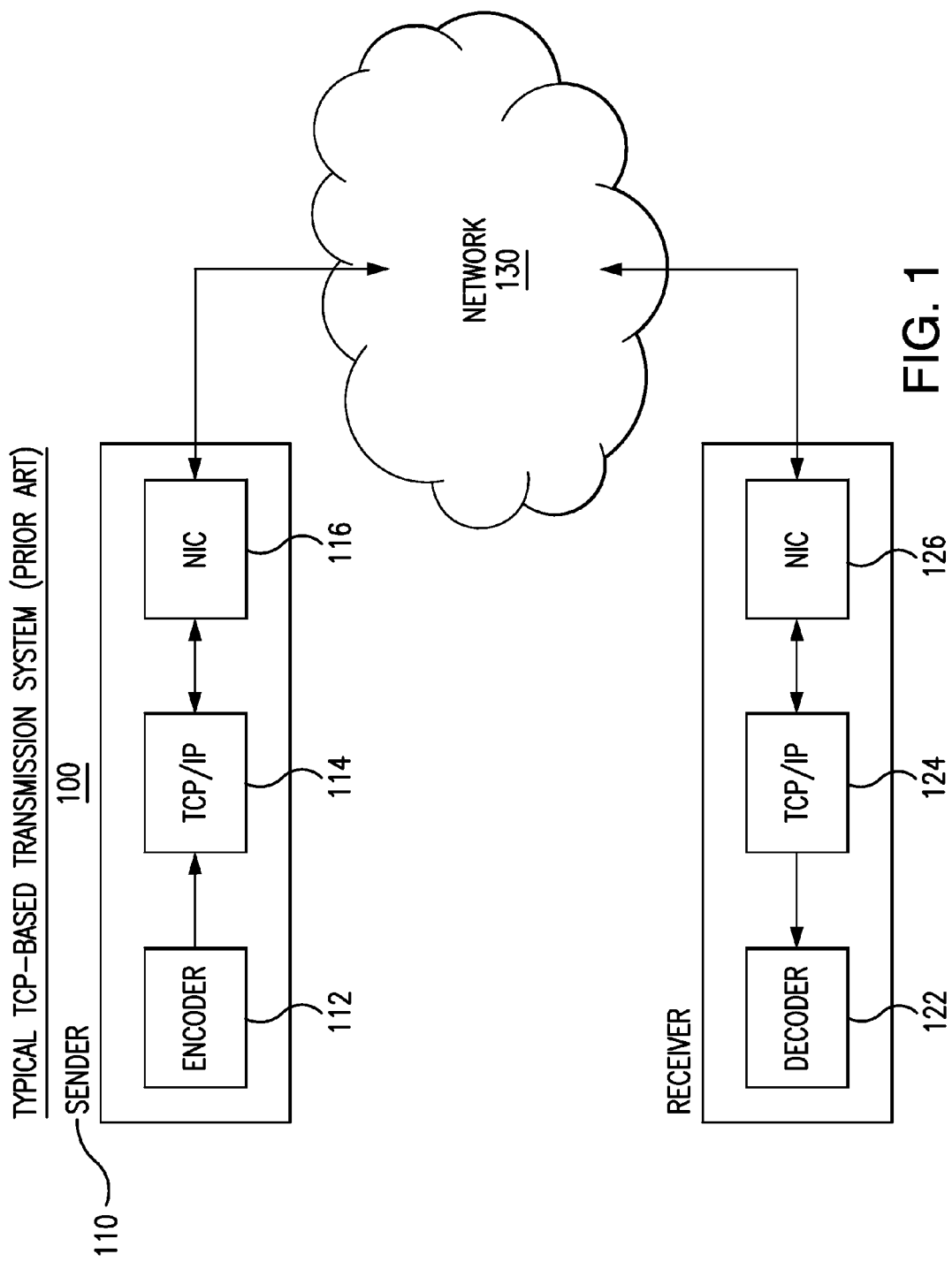
FIG. 1 is a schematic diagram illustrating the architecture of a typical TCP-based communication system (prior art)

Throughout the figures the same reference numerals and characters, unless otherwise stated, are used to denote like features, elements, components or portions of the illustrated embodiments. Moreover, while the present invention will now be described in detail with reference to the figures, it is being done so in connection with the illustrative embodiments.

DETAILED DESCRIPTION OF THE INVENTION

FIG. 1 shows the architecture of a conventional system 100 for TCP-based transmission of media data between a sender 110 and a receiver 120 over a network 130. At sender 110, an encoder 112 produces audio or video data that is directly provided to a TCP stack (e.g., TCP/IP stack 114), which then transmits packet-data through a Network Interface Controller (NIC) 116 over network 130 to receiver 120. NIC 126 in receiver 120 receives the packet-data and provides the data via TCP/IP stack 124 to the receiver's decoder 122 for decoding and display. The TCP/IP components of sender 110 and receiver 120, in coordination, ensure reliable delivery of the transmitted data by performing retransmission, and also apply the TCP flow control and congestion avoidance algorithms. It is noted that the connections at sender 110, from encoder 112 to TCP/IP stack 114, and at receiver 120, from TCP/IP stack 124 to decoder 122, are both unidirectional connections. The connections between the TCP/IP components and the NICs are all bi-directional, as TCP is an inherently bi-directional transport protocol (i.e., since TCP acknowledgment packets are transmitted from the Receiver to the Sender, as per standard TCP operation).

Although FIG. 1 shows the architecture of system 100 in the context of live audio or video transmission, it is to be understood that the same architecture can be used for low-delay transmission of pre-coded data. In such case, encoder 112 is replaced by a component that obtains pre-coded data from mass storage, random access memory, or another suitable digital memory device. Similarly, although FIG. 1 shows system 100 having a one-way sender-receiver connection, it is to be understood that the system architecture shown is readily extended to two-way (interactive) communication. In such case, encoders 112 and decoders 116 are placed in symmetric positions in both the receiver and sender.

Figure 2:
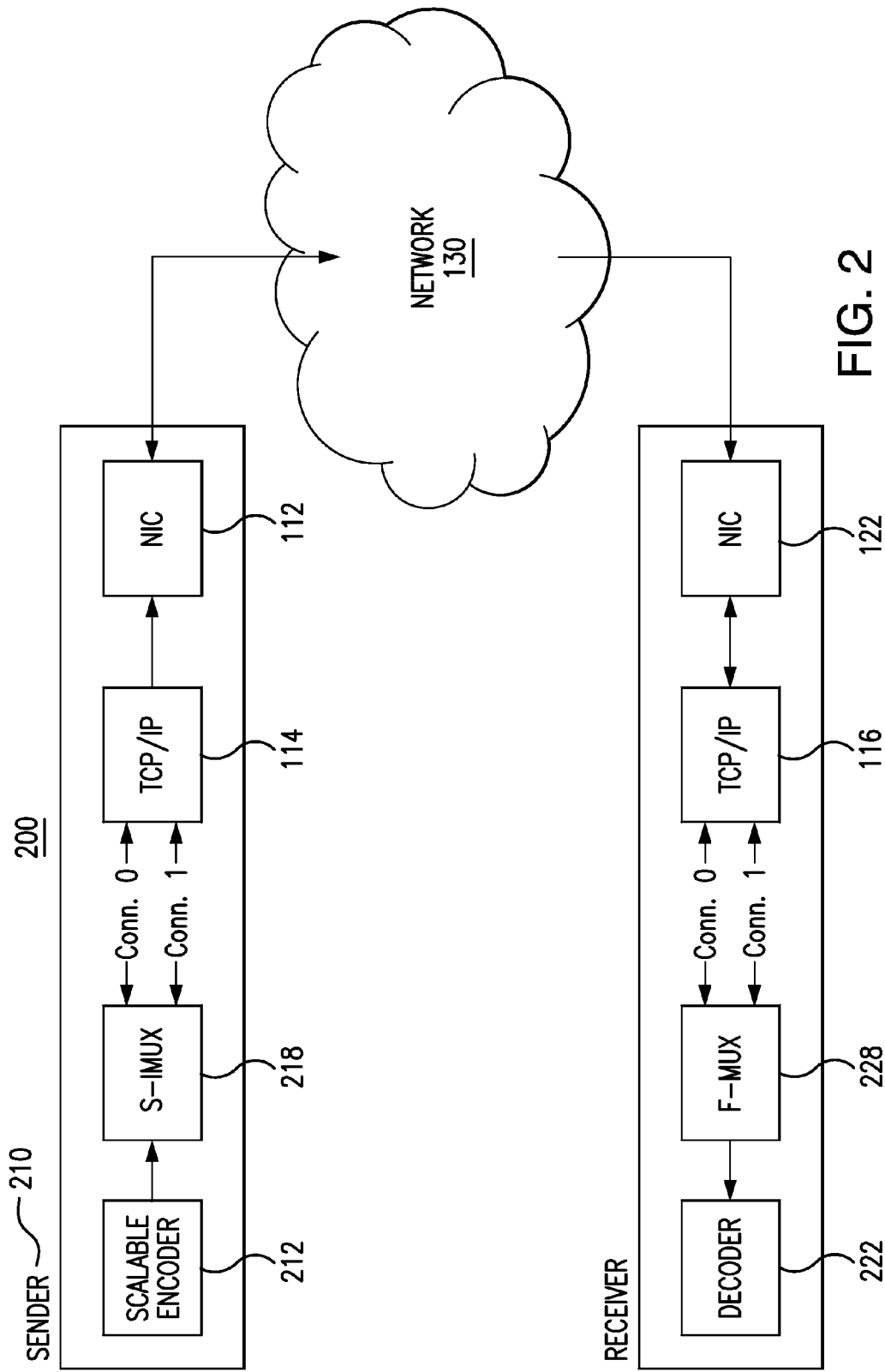
FIG. 2 is a schematic diagram illustrating the architecture of an exemplary communication system having multiple TCP connections, a Scheduling Inverse Multiplexer (S-IMUX), and a Feedback Multiplexer (F-MUX), in accordance with the principles of the present invention.

FIG. 2 shows the architecture of an inventive system 200 in which sender 210 makes scheduling decisions based on the transmitted media packets' importance and feedback from receiver 222. In system 200, sender 210 has an encoder 212, which is a scalable encoder that is connected to a Scheduling Inverse Multiplexer (S-IMUX) 218. S-IMUX 218 demultiplexes scalable coded?? packets received from encoder 212 over a plurality of TCP connections to TCP/IP stack 114. For clarity, FIG. 2 shows only two such connections in system 200 (i.e., Conn. 0 and Conn. 1). It will be understood, however, that any suitable number of TCP connections may be used. S-IMUX 218 is responsible for managing the transmission of the different encoded media packets over the plurality of TCP connections, taking into account the system's state as well as each packet's priority with respect to its role or hierarchical position in the scalability structure of encoder 212. The encoded media packets are transported via TCP/IP stack 114 through NIC 112 over communication network 130 to receiver 220. At receiver 220, packets received through NIC 122 and TCP/IP stack 116 over the multiple TCP connections Conn. 0 and Conn. 1 are collected by a Feedback Multiplexer (F-MUX) 228. F-MUX 228 forwards the packets to decoder 222 for decoding and display or playback, and also produces the receiver feedback packets that are required in the operation of S-IMUX 218 at sender 210.

It is noted that the connections between S-DMUX 218 and the TCP/IP component 114 in sender 210, and TCP/IP component 116 and F-MUX 228 in receiver 220 are both bi-directional. This is because application-level feedback packets are transmitted from receiver 220 to sender 210, in addition to, and separately from, the TCP acknowledgement packets.

Like system 100 shown in FIG. 1, system 200 is shown in FIG. 2 in the context of live audio or video transmission. However, as in the case of system 100, the shown system 200 architecture can be used for low-delay transmission of pre-coded data. In addition, although a one-way connection is shown, the shown system 200 architecture is readily extended to two-way (interactive) communication by duplicating the sender modules in the receiver and vice versa.

Figure 3:
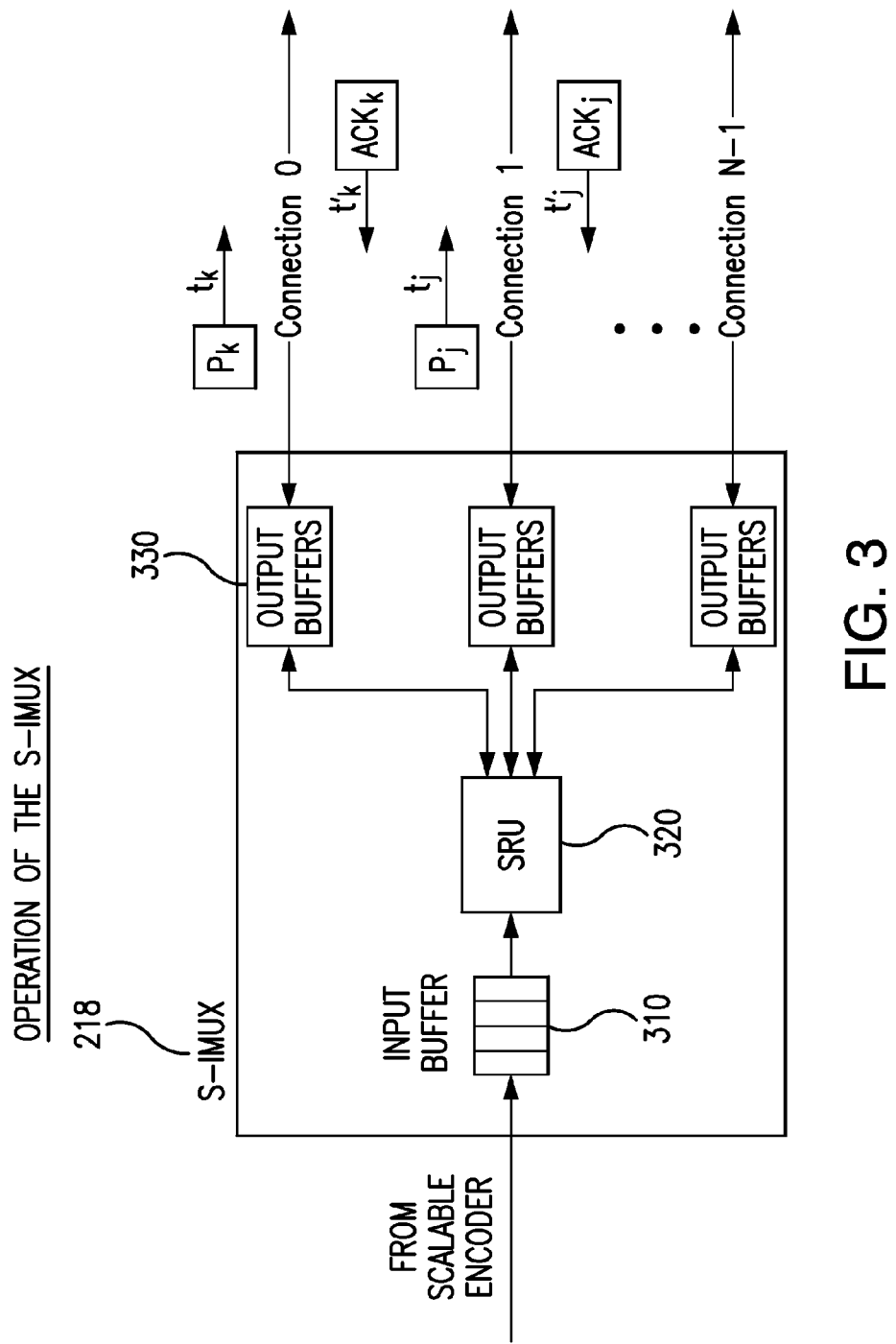
FIG. 3 is a schematic diagram illustrating the operation of the Scheduling Inverse Multiplexer (S-IMUX), in accordance with the principles of the present invention.
Figure 4:
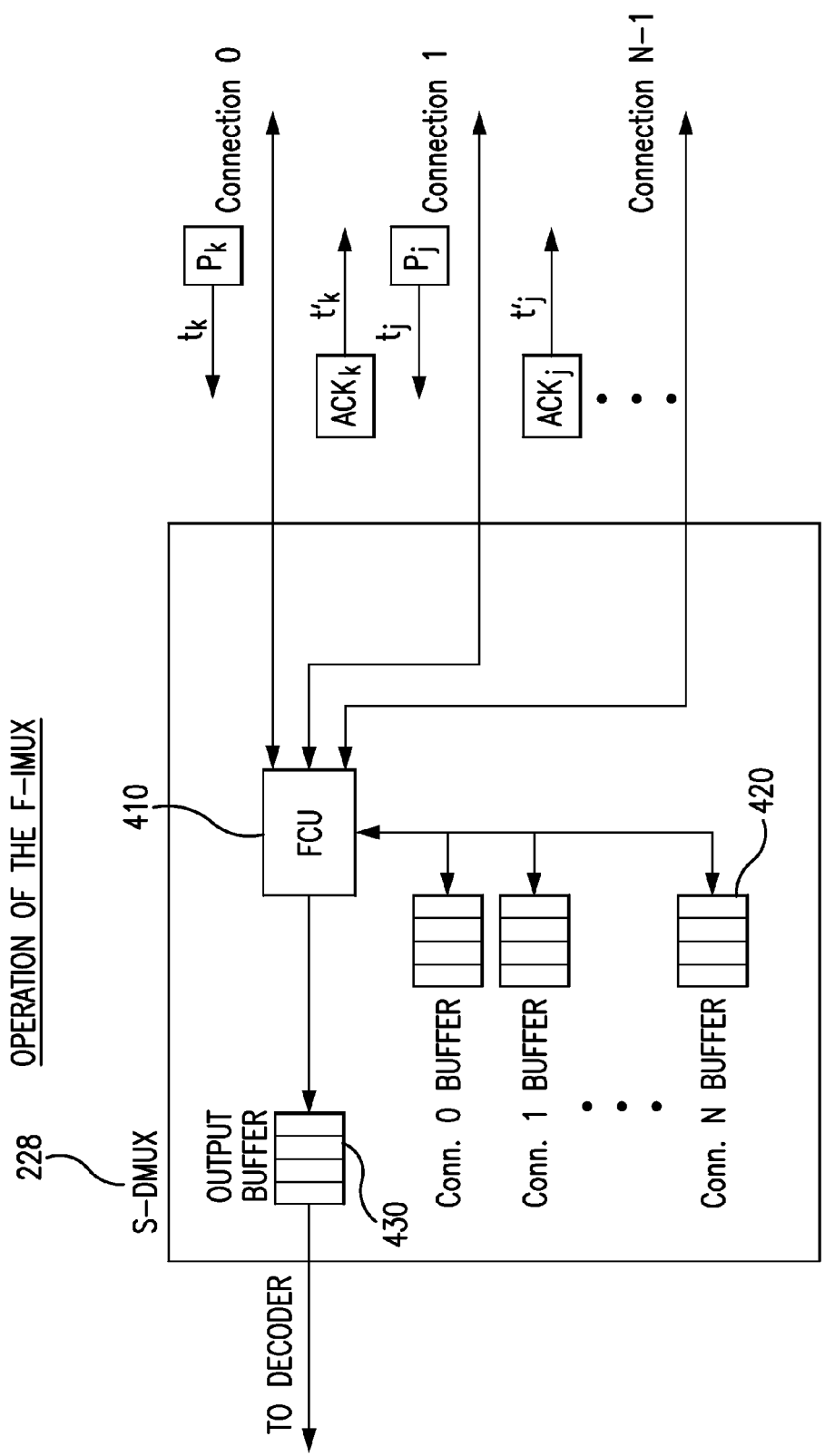
FIG. 4 is a schematic diagram illustrating the operation of the Feedback Multiplexer (F-MUX), in accordance with the principles of the present invention.

The inventive system 200 differs fundamentally from conventional systems (e.g., system 100) in at least two ways. First, instead of establishing a single TCP connection, the inventive system transmits the media packets over multiple TCP connections (FIGS. 2-4). This allows a more constant transmission rate to be maintained than is possible over a single TCP connection, and provides greater flexibility in responding to network-induced effects such as packet loss and congestion. Second, by incorporating the relative importance of the media packets in the scheduling decisions at S-IMUX 218 at the sender, system 200 "cross-layer" optimizes media communication. In combination with the transmission over multiple TCP connections, this cross-layer optimization further improves the audio-visual quality of the media presentation at the receiver.

The operation of system 200 in a communication session is described herein with reference to FIGS. 3 and 4, which show the operations of S-IMUX 218 and F-MUX 228, respectively. At the beginning of the communication session, sender 210 establishes a plurality of TCP connections with receiver 220 (e.g., 'N' connections, where N is a positive integer and is a design parameter). FIG. 3 shows the operation of S-IMUX 218 with the N connections already in place and available for use. As media packets are passed by scalable encoder 212 to S-IMUX 218 they are placed in an input buffer 310. S-IMUX 218 then decides if and when to transmit the buffered packets (e.g., Pj-Pk), and over which of the N connections to transmit each of the packets. The decisions are made by S-IMUX 218's Scheduling and Routing Unit (SRU) 320, which makes the decisions based on the importance of the individual packets (e.g., relative to the scalability structure) and also on feedback received from receiver 220's F-MUX 228 in the form of acknowledgement packets (e.g., ACKj-ACKk). SRU 320 includes suitable scheduling algorithms for this purpose. When a packet (e.g., Pj) is to be transmitted over a given connection (e.g., connection 1), it is placed in that connection's Output Buffer 330 until removed or replaced by SRU 320.

With continued reference to FIG. 3, assume that packets $P_j, \ldots, P_k, \ldots$, for k>j, are provided by scalable encoder 212 to S-IMUX 218 and transmitted on Connection 1, ..., Connection 0, ... at times $t_j, \ldots, t_k, \ldots$, respectively, as decided or determined by SRU 320. Receiver 210's F-MUX 228 acknowledges the receipt of these packets via acknowledgement packets ($ACK_j$-$ACK_k$) sent back to SRU 320. The arrival times of the respective acknowledgements at the sender are denoted by $t'_j, \ldots, t'_k, \ldots$.

Error control in SRU 320's scheduling algorithm may be incorporated in the following manner. Let the current packet operated on by SRU 320 be $P_j$. SRU 320 transmits packet $P_j$ on Connection 1 at the time instance $t_j$. SRU 320 then waits up to 'T' units of time to receive the corresponding acknowledgement on Connection 1, where T is a design parameter. If an acknowledgement arrives by time $t_j$+T, SRU 320 proceeds to the next packet in the input buffer. If, however, no such acknowledgement packet has arrived by time $t_j$+T, SRU 320 flags Connection 1 as being unavailable at the moment (due to packet loss or congestion experienced thereon) and prepares for other packet scheduling steps. It is noted that TCP will continue trying to deliver this packet $P_j$ on Connection 1 due to its property of reliable delivery.

The next step in SRU 320's packet scheduling procedure depends on the importance of packet $P_j$. A "key video picture" or "key audio frame" (or parts thereof) is a picture or audio frame for which delivery is necessary in order to ensure an uninterrupted visual experience of the media presentation at the receiver. In scalable coding a key picture or key audio frame corresponds to the lowest temporal layer across all scalability dimensions provided by the encoder. In the following description, all such packets are referred to as key packets, without differentiating whether the encoded media is audio or video.

If the unacknowledged packet $P_j$ is not a key packet, then it is not retransmitted. S-IMUX 218 discards $P_j$ and all subsequent packets received from scalable encoder 212 until a new key video picture or audio frame packet $P_k$, for k>j, is received for transmission. S-IMUX 218 then proceeds to transmit this new packet using the procedure described above for packet $P_j$.

If the unacknowledged packet $P_j$ is a key packet, SRU 320 checks in a round-robin fashion if another connection (e.g., Connection 2) can be used to retransmit packet $P_j$. SRU 320 may do this, for example, by verifying that the last packet sent on a particular connection (e.g., Connection 2) has been eventually acknowledged, i.e., it is no longer marked or flagged as unavailable. If that is the case, SRU 320 then transmits packet $P_j$ on Connection 2. SRU 320 will repeat the process of retransmitting packet $P_j$ over other connections scanned in a round-robin fashion, until eventually the packet is acknowledged on one of the connections. When one such acknowledgement arrives, SRU 320 is done with packet $P_j$ and can move on to transmitting another packet from the input buffer 310. This other packet is not necessarily the packet immediately following $P_j$ in input buffer 310.

When the receipt of key packet $P_j$ is acknowledged after an initial failed transmission attempt, SRU 320 is in a congestion recovery mode. In order to minimize the amount of data to be transmitted, SRU 320 selects the next packet for transmission to be either the earliest key packet present in input buffer 310 or, if no such packet is yet available, it selects the latest packet $P_k$, where k>j. In this process, SRU 320 will skip over to the selected key packet in input buffer 310, and discard (i.e., not transmit) all other in-between packets received from scalable encoder 212. Transmission of the selected packet proceeds in the same manner as described herein.

SRU 320's scheduling algorithm is designed to allow the communication network to recover from the temporary congestion as detected by the missing acknowledgement $ACK_j$ on Connection 1. As SRU 320 sends no data until the next key picture (e.g., $P_k$) is due to be transmitted, SRU 320 in fact provides for faster congestion recovery of the communication network. Furthermore, by design, the intervening packets discarded by SRU 320 are not crucial for the continuous reconstruction of the media presentation at the receiver. It is expected that the temporary reduction in visual or audio quality of the presentation at the receiver due to non-receipt of the intervening packets is not dramatic, due to the scalable nature of the media encoding.

It is noted that the scheduling algorithm of SRU 320 may continue to use a particular connection for subsequent transmissions of new packets, as long as the previous transmissions (on this same connection) are acknowledged in a timely manner (e.g., within the timer expiration limit T). While a connection is healthy (i.e., it has not timed out on a transmission), there is no reason to switch to any of the other N−1 TCP connections. Continued use of a healthy connection allows the other connections to remain open to potentially receive any pending acknowledgements for recent transmissions thereon, and thereby indicate recovery from congestion and/or packet loss that might have affected some of them recently.

The detailed processing steps of SRU 320 are listed in TABLE I using pseudo-code.

In TABLE I, n ∈ {0, 1, ..., N−1} represents the connection number, P is the current packet, t denotes the current system time, and $t_0$ is a helper variable that stores time values. The flag 's' is used to signal if packet skipping in input buffer 310 has to occur after an initial failed transmission attempt of a key packet (i.e., the first transmission of a packet timed-out). The flag is not necessary for non-key packets, as they are not retransmitted and the skipping can occur immediately. The function Free(n) is defined to return a 0 if connection 'n' is currently waiting for an acknowledgement packet and is thus unavailable for transmission, and 1 otherwise. Free(n) can be trivially implemented by associating a parameter 'ack_state' with each connection, which is set to 1 when a packet is transmitted, and reset when the corresponding acknowledgement is received. In such implementation, Free(n) simply returns the value of that flag for connection n. It is assumed that ACKs received at S-IMUX 218 are processed asynchronously to the processing steps shown below.

TABLE I

SRU 218 PROCESSING STEPS:

(1) Initialize:
    P := next packet from Input Buffer
    s := 0    /* reset skip flag */
(2) Get a free connection:
    while (! Free(n) )
        n := (n+1) mod N TABLE I-continued

SRU 218 PROCESSING STEPS:

(3) Transmit:
    Transmit P on Connection n
    $t_0$ := t
(4) ACK or time out:
    if (ACK received)
        if (s == 1)    /* check if we timed-out before, so we have to skip */
            do    /* skip to earliest key, or last Input Buffer packet */
                P := next packet from Input Buffer
            while (P != key packet)
        else    /* we didn't time-out before, no skip */
            P := next packet from Input Buffer
        s := 0    /* reset skip flag for the next packet */
        GOTO "(2) Get a free connection"
    elsif (t > $t_0$+T) /* time-out occurred */
        If (P == key packet)
            s := 1    /* signal that we timed-out at least once */
            GOTO "(2) Get a free connection"
        else    /* not a key packet */
            do    /* skip immediately to next key packet */
                P := next packet P from Input Buffer
            while (P != key packet)
            GOTO "(2) Get a free connection"
            END The value for the time-out parameter T is preferably selected in consideration of the round-trip time (RTT) observed on the network path between sender 210 and receiver 220. In particular, a judiciously selected T would not incur unnecessary retransmissions of media packets due to the late arrival of acknowledgements for the previous transmissions. At the same time, T should not unnecessarily delay retransmissions waiting for acknowledgements that will never materialize at the sender. Furthermore, the value selected for T must also account for the dynamics of the RTT over time and the related dispersion of its values. The processing steps listed in TABLE 1 may further include an upper limit on the number of retransmission attempts for a key frame, after which the connection is considered lost or not in service. This upper limit may be expressed by a second time-out parameter, T2, which may be set at a value several times that of parameter T.

One approach to take into account all these requirements is to select T in the same way as TCP, where T is computed as mean(RTT)+α*std(RTT), where the multiplier α has the value 3 or 4. This quantity is dynamically updated as the values of the mean RTT and its standard deviation are (re)computed over time (i.e., online). To this end, the statistics of the RTT can be computed online by sender 210 based on the ACK packets or, if RTCP reports are available in system 200, they can be obtained through their periodic exchange between senders and the receivers.

FIG. 4 shows the operation of F-MUX 228 at receiver 220 corresponding to the operation of S-IMUX 218 with the N connections already in place and available for use (FIG. 3). The N TCP connections (e.g., Connection 0, ..., Connection N−1) are terminated at the F-MUX Feedback and Combiner Unit (FCU) 410. As soon as a packet $P_j$ arrives on a connection n, a corresponding feedback packet $ACK_j$ is transmitted back from FCU 410 to sender 210 on the same connection n. FCU 410 is also responsible for reassembling the different packets arriving on the multiple connections into a single packet stream created in F-MUX output buffer 430, as well as for discarding duplicate packets that may be received due to the retransmissions performed by S-IMUX 218's SRU 320. FCU 410 is also connected to a set of N connection buffers 420 ('Connection 0 Buffer' through 'Connection N−1

Buffer'), which are used by the FCU to temporarily store incoming packets for reordering and to also know which packets have already been received so that duplicates are eliminated.

The proper ordering of incoming packets for the single packet stream created in F-MUX output buffer 430 is dependent on the particular scalability structure used in system 200. As an illustrative example, assume that scalable encoder 212 (FIG. 2) is a scalable video encoder that operates with two spatial layers and three temporal layers, as described in International Patent Application PCT/US06/028365. FIG. 5 shows an exemplary picture coding structure 500 for such an encoder. The prediction paths in structure 500 that may be used by encoder 212 are designated by arrows. The key packets for such an encoder are those that carry L0 data, i.e., the lowest spatial and temporal layer. The systems and methods of the present invention are designed to ensure the timely delivery of this data, as it is crucial for decoding of the data of all other layers (L1-L2, S0-S2).

In this example, FCU 410 will have to create an output packet stream in the output buffer 430 so that lower layers precede higher layers for the same temporal instance, while maintaining-proper temporal ordering of pictures (in coding order). As an example, consider that the four pictures (e.g., (L0, S0) . . . (L2, S2)) shown in FIG. 5 are received in different packets across a set of N connections. Due to the design of S-DMUX 218 (application-level retransmissions over TCP connections that ultimately ensure reliable delivery), it is theoretically possible to have multiple copies of a packet arriving at FCU 410 as well as out of order arrivals. In response to such situations, FCU 410 then places arriving packets in the corresponding connection buffers 420, and at the same time it continuously tries to assemble the output buffer 430 stream by including, in sequence, packets for L0, S0, the first L2 and S2, L1 and S1, and finally the second L2 and S2 (assuming all layers are to be received at the FCU). In doing so, FCU 410 examines all connection buffers 420 to find the appropriate packet at each step in sequence. When such a packet is found, it is removed from the buffer where it is located. While searching for the correct packet, FCU 410 can also remove duplicate packets that are no longer needed using the timing or picture ordering information that all standard codecs embed in their packetized data.

The embodiments of the invention as described above assumes that the internal TCP control parameters are not available to the application level. In other words, the TCP/IP components of the sender and receiver are assumed to be "black boxes," and accessible only through their standard interfaces (e.g., sockets). When access to TCP source code is available to the designer, it may be possible to utilize TCP's acknowledgement status information and to thereby avoid transmitting an application-level acknowledgment packet from the receiver to the sender, in accordance with the present invention. The bit rate savings, however, may not be very significant, especially in a two-way communication system where large amounts of media data flow in both directions.

It will be understood that in accordance with the present invention, the transmission techniques described herein may be implemented using any suitable combination of hardware and software. The software (i.e., instructions) for implementing and operating the aforementioned rate estimation and control techniques can be provided on computer-readable media, which can include, without limitation, firmware, memory, storage devices, microcontrollers, microprocessors, integrated circuits, ASICs, on-line downloadable media, and other available media.

What is claimed is:

1. An audiovisual communication system including a communication network that uses the IP protocol and has a plurality of TCP connections to carry audiovisual signal data packets between a sender and a receiver, wherein audiovisual signals are scalable-coded by the sender into a set of scalable layers according to a scalable coding structure for transmission over the plurality of TCP connections, and wherein portions of the scalable layers data are designated as key frames, the system comprising:

a Scheduling Inverse Multiplexer (S-IMUX) coupled to the plurality of TCP connections at the sender, wherein the S-IMUX is configured to schedule transmission of individual scalable-coded data packets over the plurality of TCP connections;

a Feedback Multiplexer (F-MUX) coupled to the plurality of TCP connections at the receiver, wherein the F-MUX is configured to reassemble individual scalable-coded data packets received over different TCP connections in a single packet stream for decoding;

wherein the S-IMUX is configured to:

transmit a non-key frame only once over a TCP connection even if receipt of the non-key frame by the receiver is unacknowledged within a pre-determined time period 'T', and discard all non-key frames following the unacknowledged non-key frame until the next available key frame in the audiovisual signal;

wherein the S-IMUX is further configured to:

transmit a key frame over a particular open TCP connection; and if receipt of the key frame over the particular open TCP connection is not acknowledged within a pre-determined time period 'T', transmit the unacknowledged key frame over another open TCP connection;

wherein an open TCP connection is a TCP connection that is currently not waiting for an acknowledgement of the receipt of a previous transmission on the TCP connection.

2. A method for audiovisual communication over a communication network that uses the IP protocol and has a plurality of TCP connections to carry audiovisual signal data packets between a sender and a receiver, wherein audiovisual signals are scalable-coded by the sender into a set of scalable layers according to a scalable coding structure for transmission over the plurality of TCP connections, and wherein portions of the scalable layers data are designated as key frames, the method comprising:

at the sender, scheduling transmission of individual scalable-coded data packets of the audiovisual signal over the plurality of TCP connections;

at the receiver, reassembling individual scalable-coded data packets received over different TCP connections in a single packet stream for decoding;

wherein scheduling transmission of individual scalable-coded data packets of the audiovisual signal over the plurality of TCP connections comprises:

transmitting a non-key frame only once over a TCP connection even if receipt of the non-key frame by the receiver is unacknowledged within a pre-determined time period 'T'; and, discarding all non-key frames following the unacknowledged non-key frame until the next available key frame in the audiovisual signal;

wherein scheduling transmission of individual scalable-coded data packets of the audiovisual signal over the plurality of TCP connections further comprises:

transmitting a key frame over a particular open TCP connection; and if receipt of the key frame over the particular open TCP connection is not acknowledged within a pre-determined time period 'T', transmitting the unacknowledged key frame over another open TCP connection, wherein an open TCP connection that is a TCP connection that is currently not waiting for an acknowledgement of the receipt of a previous transmission on the TCP connection.

3. Non-transitory computer readable media comprising a set of instructions to perform the steps recited in the method claim 2.

\* \* \* \* \*